United States Patent
Hunt et al.

(10) Patent No.: US 9,528,551 B2
(45) Date of Patent: Dec. 27, 2016

(54) METHOD FOR MAKING A BEARING COMPONENT, A BEARING COMPONENT, A DOWN HOLE DEVICE AND A DOWN HOLE BEARING ASSEMBLY

(71) Applicant: Black Tip Services, LLC, Broussard, LA (US)

(72) Inventors: Mark Hunt, Tomball, TX (US); Andrew Bell, Forthampton (GB); Zhongming Wang, The Woodlands, TX (US)

(73) Assignee: BLACK TIP SERVICES, LLC, Broussard, LA (US)

( * ) Notice: Subject to any disclaimer, the term of this patent is extended or adjusted under 35 U.S.C. 154(b) by 90 days.

(21) Appl. No.: 14/504,186

(22) Filed: Oct. 1, 2014

(65) Prior Publication Data

US 2015/0093058 A1   Apr. 2, 2015

Related U.S. Application Data

(60) Provisional application No. 61/885,701, filed on Oct. 2, 2013.

(51) Int. Cl.

| | | |
|---|---|---|
| F16C 3/00 | (2006.01) | |
| F16C 33/04 | (2006.01) | |
| B22D 21/06 | (2006.01) | |
| E21B 4/00 | (2006.01) | |
| B22D 19/14 | (2006.01) | |

(52) U.S. Cl.
CPC ............ *F16C 33/043* (2013.01); *B22D 19/14* (2013.01); *B22D 21/06* (2013.01); *E21B 4/003* (2013.01); *F16C 2202/04* (2013.01); *F16C 2206/80* (2013.01); *F16C 2226/34* (2013.01); *F16C 2240/48* (2013.01)

(58) Field of Classification Search
CPC ..... F16C 33/043; F16C 33/121; F16C 33/125; F16C 33/14; F16C 2202/04; F16C 2206/80; F16C 2226/34; F16C 2240/48; B22D 19/14; B22D 21/06; E21B 4/003
See application file for complete search history.

(56) References Cited

U.S. PATENT DOCUMENTS

| | | | |
|---|---|---|---|
| 5,755,298 A | 5/1998 | Langford, Jr. et al. | |
| 5,755,299 A | 5/1998 | Langford, Jr. et al. | |
| 5,957,365 A | 9/1999 | Anthon | |
| 2008/0029310 A1 | 2/2008 | Stevens et al. | |
| 2008/0282618 A1* | 11/2008 | Lockwood | E21B 10/46 51/295 |
| 2013/0043078 A1* | 2/2013 | Qian | F16C 33/043 175/428 |
| 2013/0182982 A1* | 7/2013 | Dennis | F16C 33/043 384/456 |

* cited by examiner

*Primary Examiner* — James Pilkington
(74) *Attorney, Agent, or Firm* — Christenson Fonder P.A.

(57) ABSTRACT

A bearing component including a body of composite material having a surface configured as a bearing surface, the composite material including a plurality of round particles bound by a braze material, each of the plurality of round particles comprising a round outer layer encapsulating a wear resistant element.

10 Claims, 13 Drawing Sheets

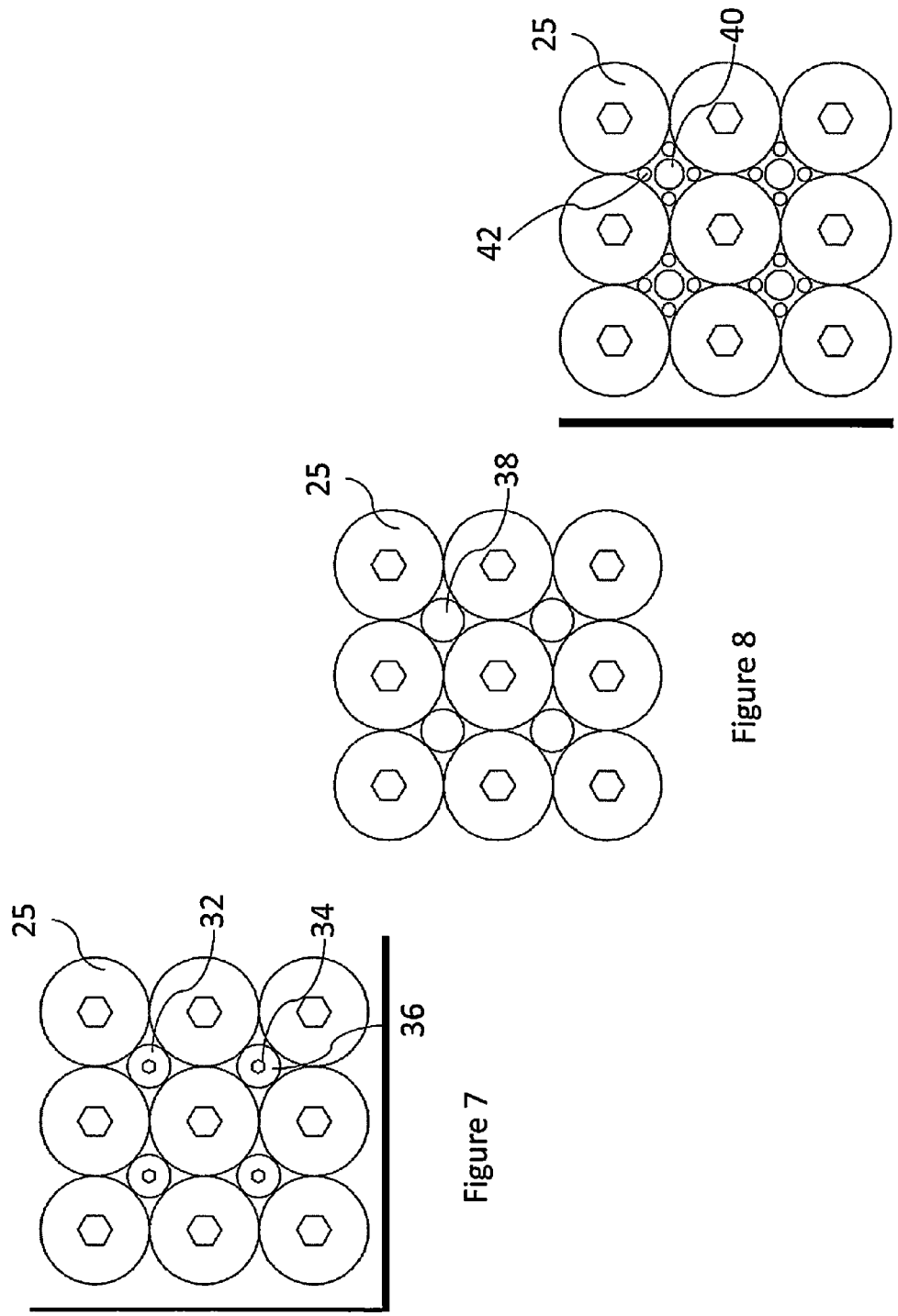

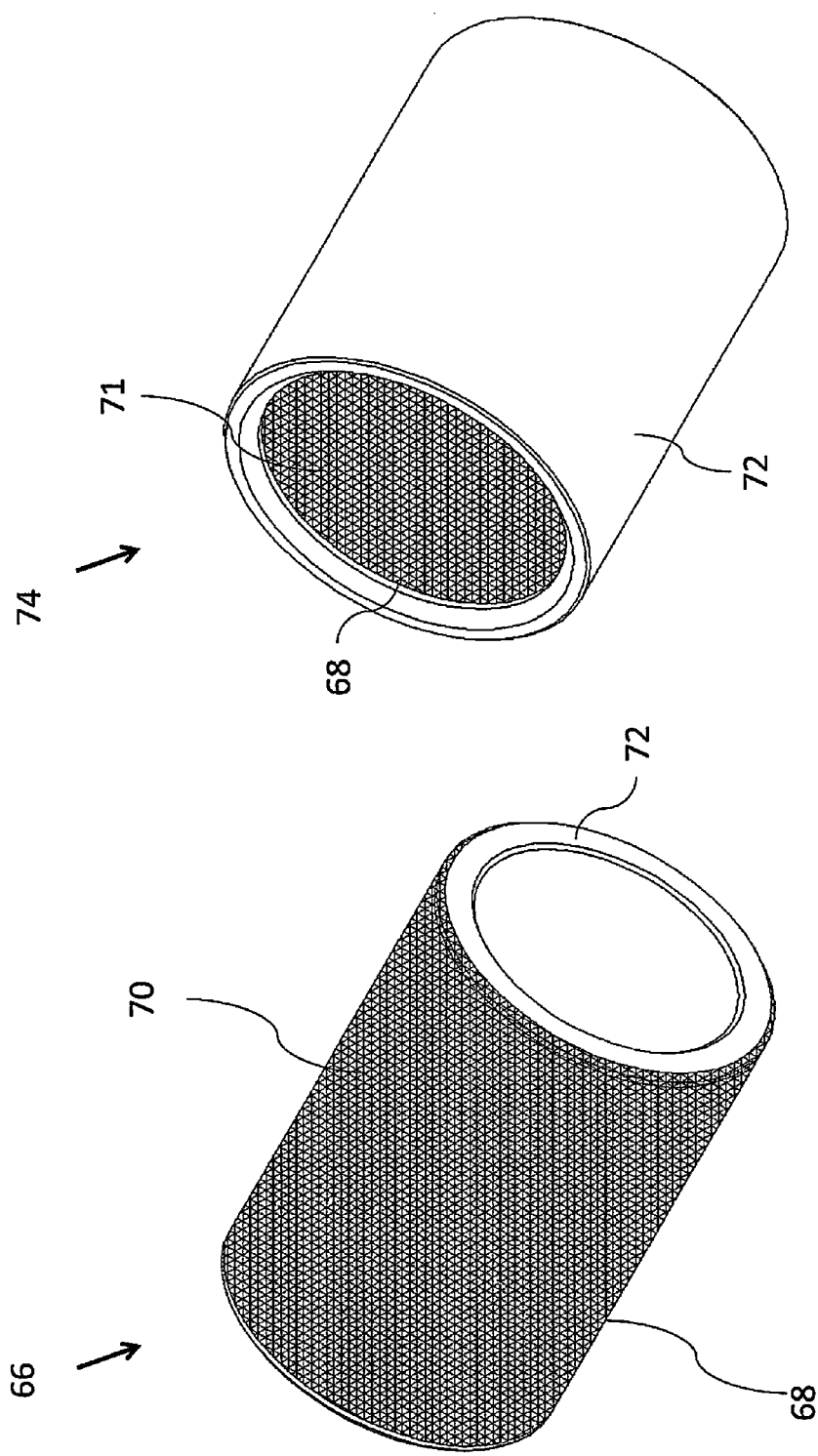

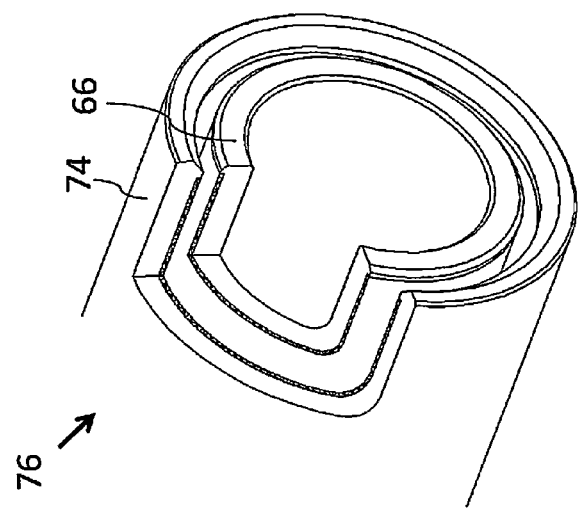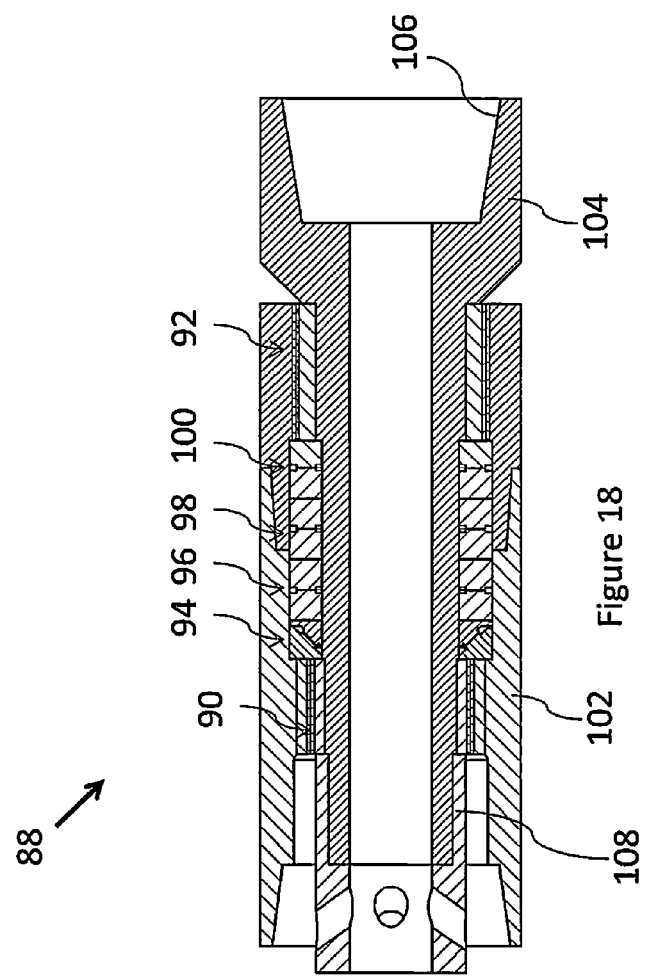

METHOD FOR MAKING A BEARING COMPONENT, A BEARING COMPONENT, A DOWN HOLE DEVICE AND A DOWN HOLE BEARING ASSEMBLY

RELATED APPLICATION

The present application claims priority to U.S. Provisional Patent Application No. 61/885,701, filed Oct. 2, 2013, the disclosure of which is hereby incorporated by reference herein in its entirety.

TECHNICAL FIELD

The disclosure herein generally relates to a method for making a bearing component, a bearing component, a down hole device having a bearing component, and a down hole bearing assembly having a bearing component.

BACKGROUND

Some mechanical systems use bearings. Examples of such systems include but are not limited to subterranean drilling systems commonly used for oil and gas exploration and production. A subterranean drilling system typically circulates a fluid (for example, drilling "mud", as it is known in the oil and gas industry) at high pressure through a down hole motor. Torque is generated by the fluid passing through the down hole motor's which is coupled to a mandrel constrained by bearings within a down hole bearing assembly. A distal end of the mandrel is coupled to a drill bit.

The wear resistance and/or load carrying capacity of the bearings may generally relevant to at least one of the performance of the subterranean drilling system, operating costs, and the length of time between service of the down hole motor assembly. Generally any improvement in the wear resistance and/or load carrying capacities of the bearing surfaces may be favourable.

For example, replacing the bearings now used in a down hole bearing assembly with bearings having better load bearing capacity and/or wear resistance may increase the maximum thrust load or weight-on-bit capacity of down hole motor assembly.

In another example, better bearing surfaces may improve directional drilling. The length of the bearing assembly is generally longer than desired for directional drilling. The minimum radius of a bend in a directionally drilled hole is limited to the distance between the end of the mandrel at which the drill bit is attached and a bend in the down hole assembly ("bit to bend distance"). One limitation to shortening bit to bend distances may be the length of the bearings. Improving at least one of the bearings limited load carrying capacity and wear resistance may enable the use of shorter bearings than now used in down hole assembly's that may reduce the bit to bend distance and consequently the minimum radius of a bend in a directionally drilled hole.

In yet another example, more wear resistant bearing surfaces may decrease the cost per hour of operation of the down hole assembly. The period between bearing replacements may be extended. Down time may be reduced. Wear of the bearings may result in a premature drop in the pressure of the fluid and increased radial and axial play, which are generally detrimental to at least one of drilling performance, drill bit life, the stability of the bearing assembly and the life of components therein. Threaded connections of subassemblies and even the mandrel shaft (that is, the central torque transmitting shaft) may experience increased flexural cyclic loading due to premature wear and play in the bearing system.

Longer life cycles of the bearing components may be sought to maintain peak performance, stability and life of the system as a whole.

Some bearings attempt to provide high wear resistance by the pre-placement of super hard monoliths, such as Thermally Stable Product (TSP) in a mold followed by the infiltration of metal powders surrounding them (a super hard material is a material with a Vickers hardness of greater than 40 GPa). This is time consuming and prone to filling defects beneath the monoliths. Disadvantageously, these monoliths are in very close proximity or touching the mold wall. When grinding of such a bearing commences, the super hard monoliths require grinding to provide a concentric and in-tolerance part which is generally difficult and expensive in view of the hardness of the super hard monoliths. Similarly, some bearings have Polycrystalline Diamond Compacts (PDCs) as bearing surfaces. These materials are generally backed by a supporting substrate such as cemented carbide. These are placed, bonded or joined to a steel substrate. The PDCs themselves are the order of several millimeters in diameter; i.e. 8-19 mm. To provide the required radii to form a bearing surface for a radial or angled thrust bearing requires significant grinding. Similar issues are encountered with silicon-bonded polycrystalline diamond monoliths.

Other mechanical systems that may be benefit from better bearings include, but are not limited to, rotary drill bits, generators, motors, aircraft, and locomotives.

SUMMARY

Disclosed herein is a method for making a bearing component. The method comprises disposing in a mold configured for forming the bearing component a plurality of round particles, each of the plurality of round particles comprising a round outer layer encapsulating a wear resistant element. The method comprises binding the plurality of round particles disposed in the mold with a braze material to form a body of composite material having a bearing surface. An embodiment comprises the steps of disposing the braze material into the mold and heating the braze material wherein the braze material is melted to form the body of composite material. The body of composite material may comprise a monolithic matrix of the braze material binding the plurality of round particles. The brazing material so melted may penetrate the round outer layer of each of the plurality of round particles.

An embodiment comprises the step of metallurgically bonding the braze material to at least one of an inner surface and an outer surface of the round outer layer of each of the plurality of round particles.

In an embodiment, the wear resistant element of each of the plurality of round particles has a coating metallurgically bonded thereto, the coating being metallurgically bondable to the braze material.

An embodiment comprises the step of coating the wear resistant element of each of the plurality of round particles with the coating metallurgically bondable to the braze material.

An embodiment comprises the steps of the penetrating the round outer layer of each of the plurality of round particles with the brazing material and forming a metallurgical bond between the braze material and the coating.

Generally, the round outer layer of each of the plurality of round particles controls the spacing and/or the packing of the wear resistant elements of the plurality of round particles within the mold and bearing component when made, particularly when the wear resistant elements are of various sizes and shapes, or are not round. Consequently, the thickness of the round outer layer may be chosen to control the number of wear resistant elements per unit volume. The thickness of the round outer layer may be chosen to control the wear resistant element's uniformity of distribution.

An embodiment comprises the step of polishing the bearing surface. The step of polishing the bearing surface may comprise polishing the bearing surface with another body of composite material. The other body of composite material may contain similar or identical materials and be similarly or identically constructed to the body of composite material. The step of polishing the bearing surface may be performed before use and/or during use of the bearing component. The other body of composite material may be of another bearing component. The step of polishing the bearing surface may form a facet into the wear resistant element of each of those of the plurality of round particles that are adjacent the bearing surface. The facets so formed may be flush with the surrounds thereof. The number per unit area of the plurality of round particles adjacent the bearing surface may by greater than 100 per $cm^2$. The number per unit area of the plurality of round particles adjacent the bearing surface may by greater than 500 per $cm^2$. The number per unit area of the plurality of round particles adjacent the bearing surface may by greater than 1000 per $cm^2$.

In an embodiment, the wear resistant element of each of the plurality of round particles has an ISO 6106 mesh size 30-120. The wear resistant element of each of the plurality of round particles may have an ISO 6106 mesh size 30-100. The wear resistant element of each of the plurality of round particles may have an ISO 6106 mesh size 60-80.

In an embodiment, the round outer layer comprises a composite. The composite may be a cermet. The cermet may be a polycrystalline cermet.

In an embodiment, the wear resistant element of each of the plurality of round particles comprises a super hard material. In the context of this document, a super hard material is a material having a Vickers hardness of greater than 40 GPa. The wear resistant element of each of the plurality of round particles may have an elastic modulus of greater than 200 GPa. Alternatively, the wear resistant element of each of the plurality of round particles comprises a material having a Vickers hardness of greater than 20 GPa.

In an embodiment, the step of disposing in the mold configured for forming the bearing component the plurality of round particles comprises the step of disposing in the mold configured for forming the bearing component the plurality of round particles in close proximity. The step of disposing in the mold configured for forming the bearing component the plurality of round particles may comprise the step of disposing in the mold configured for forming the bearing component the plurality of round particles in a close packed arrangement. Because the particles are round they are able to adopt a close packed arrangement that may be denser than other packing arrangements. Consequently, the number of wear resistant elements per unit volume (and the number per unit area adjacent the bearing surface) may be greater than for bearing components having particles that are not in a close packed arrangement. Increasing the number of wear resistant elements per unit volume generally improves the bearing component's wear resistance and load capacity. Close packing may improve the capillary action that moves the braze material through the plurality of round particles during binding in which the braze material infiltrates the interstices between the plurality of round particles. Consequently, close packing may provide relatively high structural integrity by relatively better joining of the plurality of round particles and largely avoid defects that may be encountered in brazed material systems caused by inter-particle distances that are too big.

In an embodiment, a majority of the plurality of round particles each have a diameter of between 70% and 130% of a mean diameter of the plurality of round particles. The majority of the plurality of round particles may each have a diameter of between 80% and 120% of a mean diameter of the plurality of round particles. The majority of the plurality of round particles may each have a diameter of between 90% and 110% of a mean diameter of the plurality of round particles. The majority of the plurality of round particles may each have a diameter of between 95% and 105% of a mean diameter of the plurality of round particles. Perfect close packed arrangements—generally a face centered cubic arrangement, but in some embodiments a hexagonal close packed arrangement—may be achieved when the plurality of round particles are identical perfect spheres. The close packed arrangement of the plurality of round particles will generally but not necessarily have defects because the plurality of round particles generally deviate from perfect spheres and have various sizes. Nevertheless, the benefits provided by a defective close packed arrangement of the plurality of round particles may approach those of a perfect close packed arrangement.

An embodiment comprises disposing the plurality of round particles into the mold such that the plurality of round particles has a poured density. In the context of this document the meaning of 'poured density" is substantially the same as that of "freely settled density", "apparent density" or "bulk density". The step of disposing the plurality of round particles into the mold may comprise the step of pouring the plurality of round particles into the mold. The poured density is the density of the plurality of round particles immediately after they have been poured, which is less than the tapped density of the plurality of round particles, which is the density of the plurality of round particles in a more closely packed arrangement. Another plurality of particles may be disposed in the mold. The other plurality of particles may be disposed in the mold such that the other plurality of particles may have another poured density. The other plurality of round particles may be poured onto the mold. The other plurality of particles may be poured onto the plurality of round particles disposed in the mold. The other plurality of particles may be at least as hard as the constituent material of the round outer layer. The other plurality of particles may be sized to occupy a plurality of interstices between the plurality of round particles. The other plurality of particles may be round. Concurrently, the plurality of round particles may be settled and the other plurality of particles may be disposed in the plurality of interstices between the plurality of round particles by agitating the mold. The plurality of round particles may be settled into the close packed arrangement by agitation of the mold. It is found that the other plurality of particles generally cannot penetrate the plurality of round particles when the plurality of round particles are settled. It is also found that premixing the plurality of round particles and the other plurality of particles before pouring them into the mold generally results in unacceptable segregation when the mold is agitated. The other plurality of particles may be round, which may improve their penetration of the plurality of round particles. The movement of the braze material when liquid through the plurality of round particles may be enhanced by the other plurality of particles when so disposed in the plurality of interstices, which may improve the quality of the bearing component.

In an embodiment, the other plurality of particles each have a diameter that is less than at least one of 29% and 14% of a mean diameter of the plurality of round particles. This has been found to improve the movement of the other plurality of particles into the interstices between the plurality of particles. The other plurality of particles may comprise a first plurality of particles having a first mean diameter and a second plurality of particles having a second mean diameter. The second mean diameter may be less than 10% of the first mean diameter. The second plurality of particles may further increase the volume fraction of particles and reduce the interstitial volume of voids or air, which may improve wear resistance.

In an embodiment, the mold defines a circular band cavity. The body of the composite material may have a circular band configuration. The bearing component may be part of a bearing having a circular band configuration. A mean diameter of the plurality of round particles may be no more than ¼ of the thickness of the circular band cavity. This generally allows the plurality of round particles to form a close packed arrangement. The circular band cavity may have a depth of greater than 100 mm. The circular band cavity may have a thickness of less than 2 mm. A circular band cavity satisfying these dimensional restrictions may be conveniently filled by pouring the plurality of round particles and/or the other plurality of particles therein.

In an embodiment, bonding of the plurality of round particles in the mold with the braze material metallurgically bonds the body of composite material to a substrate having a circular band configuration. The substrate may be integral to the mold. The substrate may be separated from the mold with the body of composite material metallurgically attached to the substrate. Disclosed herein is a bearing component. The bearing component comprises a body of composite material. The body of composite material has a surface configured as a bearing surface. The composite material comprises a plurality of round particles bound by a braze material. Each of the plurality of round particles comprise a round outer layer encapsulating an wear resistant element.

In an embodiment, the braze material comprises a monolithic matrix of braze material.

In an embodiment, the braze material penetrates the round outer layer of each of the plurality of round particles.

In an embodiment, the wear resistant element of each of the plurality of round particles has a coating metallurgically bonded thereto, the coating being metallurgically bonded to the braze material. The braze material may be metallurgically bonded to at least one of an inner surface and an outer surface of the round outer layer of each of the plurality of round particles.

In an embodiment, the surface comprises a plurality of partially encapsulated wear resistant elements each having a polished facet flush with the surrounds thereof. Each of the partially encapsulated wear resistant elements may be partially encapsulated with a composite. The composite may be a cermet. The cermet may be a polycrystalline cermet.

In an embodiment, the number per unit area of the plurality of partially encapsulated wear resistant elements may by greater than 100 cm$^2$. The number per unit area of the plurality of partially encapsulated wear resistant elements may by greater than 500 cm$^2$. The number per unit area of the plurality of partially encapsulated wear resistant elements may by greater than 1000 cm$^2$.

In an embodiment, the wear resistant element of each of the plurality of round particles has a ISO 6106 mesh size 30-120. The wear resistant element of each of the plurality of round particles may have an ISO 6106 mesh size 30-100. The wear resistant element of each of the plurality of round particles may have an ISO 6106 mesh size 60-80.

In an embodiment, the round outer layer of each of the plurality of round particles comprises a composite. The composite may be the cermet. The cermet may be the polycrystalline cermet.

In an embodiment, the wear resistant element of each of the plurality of round particles has a Vickers hardness greater than 20 GPa. The wear resistant element of each of the plurality of round particles may have a Vickers hardness of greater than 40 GPa. The wear resistant element may have an elastic modulus of greater than 200 GPa.

In an embodiment, the plurality of round particles may be in a close packed arrangement.

In an embodiment, a majority of the plurality of round particles each have a diameter of between 70% and 130% of a mean diameter of the plurality of round particles. The majority of the plurality of round particles may each have a diameter of between 80% and 120% of a mean diameter of the plurality of round particles. The majority of the plurality of round particles may each have a diameter of between 90% and 110% of a mean diameter of the plurality of round particles. The majority of the plurality of round particles may each have a diameter of between 95% and 105% of a mean diameter of the plurality of round particles.

In an embodiment, a plurality of interstices between the plurality of round particles are occupied by another plurality of particles. The other plurality of particles may be harder than the round outer layer ("encapsulant"). The other plurality of particles may be round.

In an embodiment, the other plurality of particles each have a diameter that is less than one of 29% and 14% of the size of a mean diameter of the plurality of round particles.

In an embodiment, the other plurality of particles comprises a first plurality of particles having a first mean diameter and a second plurality of particles having a second mean diameter that is less than 10% of the first mean diameter.

In an embodiment, the body of composite material has a circular band configuration. The bearing component may be part of a bearing having a circular band configuration. A mean diameter of the plurality of round particles may be no more than ¼ of the thickness of the body of composite material.

In an embodiment, the body of composite material has a thickness less than 2 mm and a height greater than 100 mm.

In an embodiment, the body of composite material is metallurgically attached to a substrate. The substrate may have a circular band configuration.

Generally but not necessarily, the surface configured as a bearing surface is one of cylindrical and flat.

Disclosed herein is a down hole device comprising at least one bearing comprising a plurality of bearing components in accordance with the above disclosure.

Disclosed herein is a down hole bearing assembly. The down hole bearing assembly comprises a bearing assembly casing in which is housed at least one bearing having a circular band configuration, the at least one bearing comprising a plurality of bearing components in accordance with the above disclosure. The down hole bearing assembly comprises a mandrel passing through the at least one bearing. The mandrel is configured at an end thereof for attachment of a drill bit.

Any of the various features of each of the above disclosures, and of the various features of the embodiments described below, can be combined as suitable and desired.

BRIEF DESCRIPTION OF THE FIGURES

Embodiments will now be described by way of example only with reference to the accompanying figures in which:

FIGS. 7-9 shows a schematic diagram where the interstices of a plurality of round particles are occupied with another plurality of particles.

FIG. 15 shows an embodiment of a bearing component in the form of a bearing inner sleeve for a radial bearing.

FIG. 16 shows an embodiment of a bearing component in the form of a bearing outer sleeve.

FIG. 17 is a perspective cut away view of an example of radial bearing.

FIG. 18 shows an embodiment of a down hole device in the form of a down hole bearing assembly.

DESCRIPTION OF EMBODIMENTS

Figure 1:
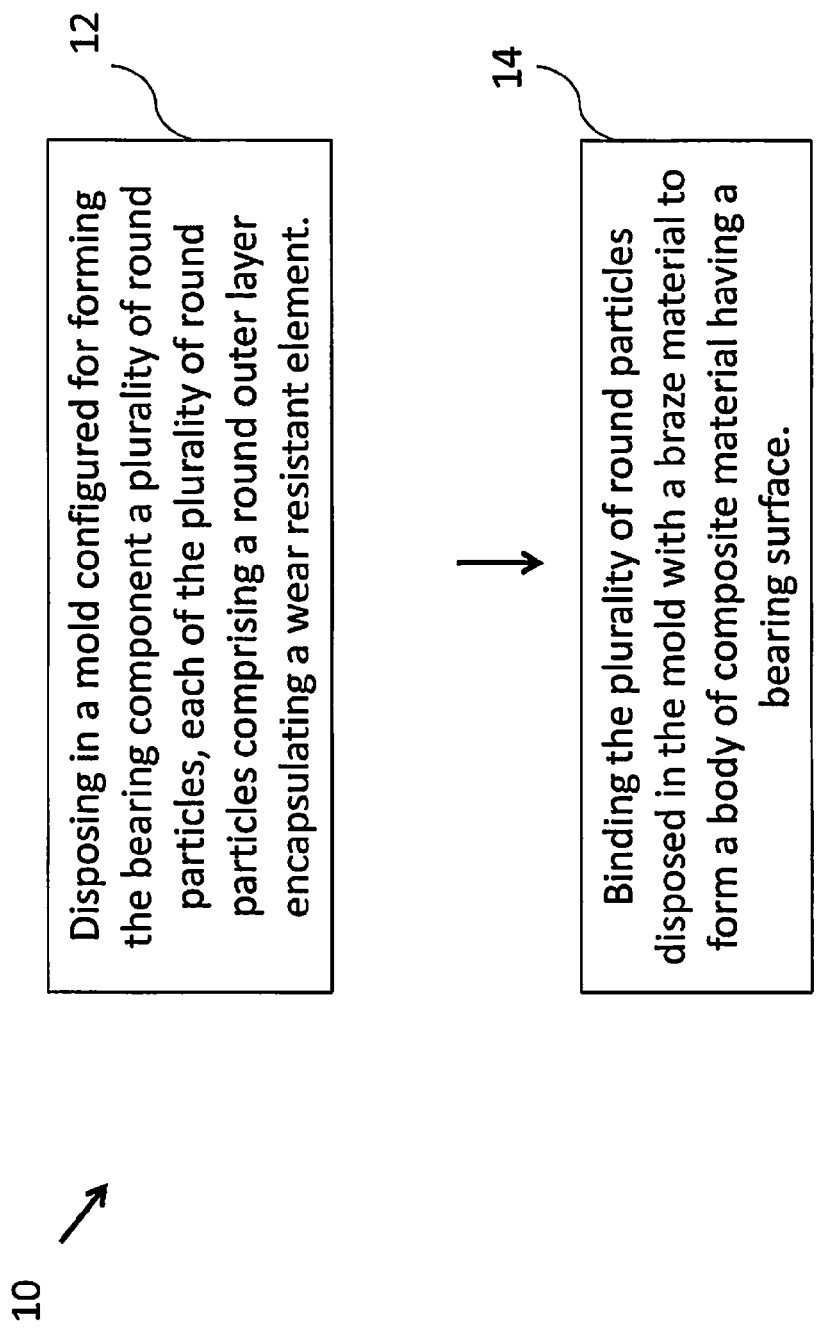
FIG. 1 shows a flow diagram of one example of a method for making a bearing component.

FIG. 1 shows a flow diagram of one example of a method for making a bearing component, the method generally being indicated by the numeral 10. In a step 12 of the method, a plurality of round particles are disposed in a mold configured for forming the bearing component. Each of the plurality of round particles comprises a round outer layer ("encapsulant") encapsulating an wear resistant element. In a step 14 subsequent to step 12, the plurality of round particles disposed in the mold are bound with a braze material to form a body of composite material having a bearing surface.

Figure 2:
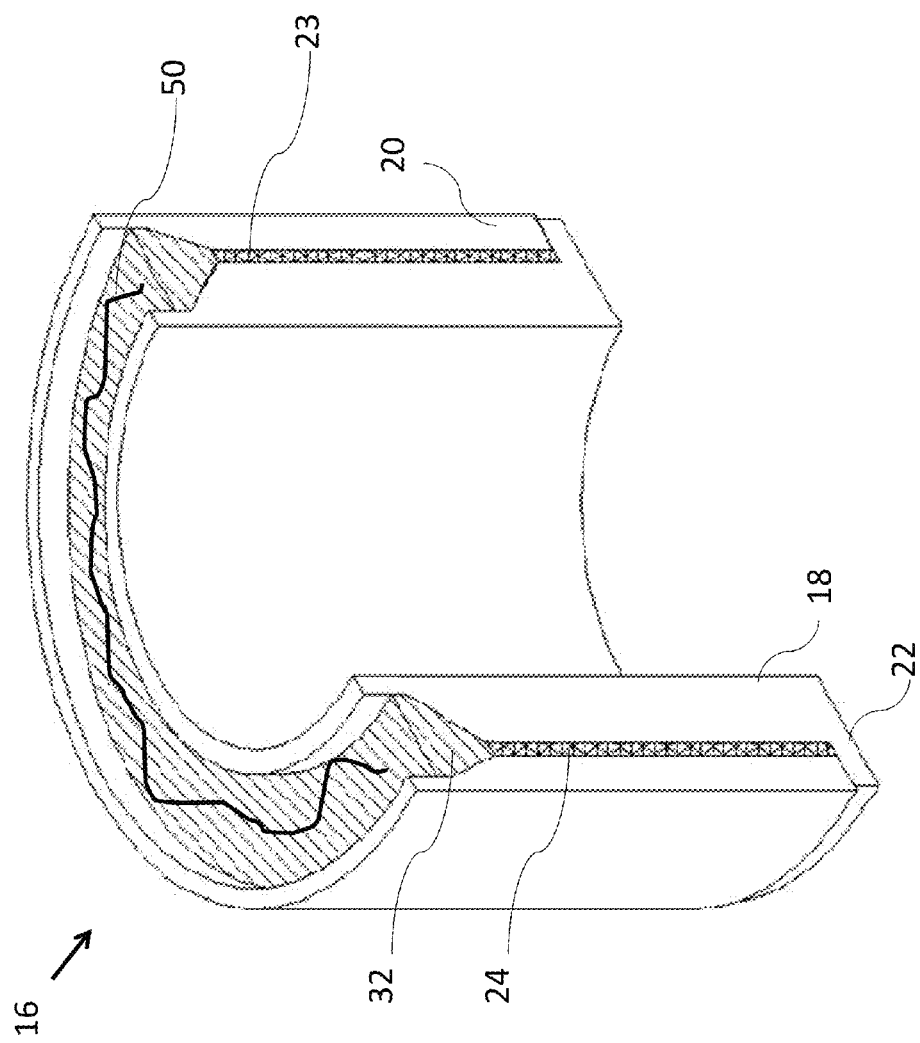
FIG. 2 shows a cutaway view of one example of a mold that is used with the method of FIG. 1.

FIG. 2 shows a cutaway view of one example of a mold 16 that is used with the method 10 of FIG. 1. The mold 16 has an inner mold sleeve 18 integral with a mold bottom 22. An outer mold sleeve 20 is located around the inner mold sleeve. A cavity 23 is formed between the inner mold sleeve 18 and outer mold sleeve 20 into which the plurality of round particles 24 are disposed. The mold 16 of FIG. 2 is configured for forming a sleeve of a radial bearing. Generally, however, the mold may be configured for forming any bearing that may be manufactured using the method of FIG. 1. The same or different materials may be used for the inner mold sleeve 18 and the outer mold sleeve 20. In some embodiments, the inner 18 and outer 20 mold sleeves are of different materials to reduce costs and to make manufacture of the bearing component easier.

The cavity 23 has a circular band configuration. The cavity may have a depth of greater than 100 mm and the cavity may have a thickness of less than 2 mm. Consequently, the cavity 23 of FIG. 2, but not necessarily of every embodiment, is relatively thin and deep, having an aspect ratio of greater than 50. Pouring the plurality of particles into the cavity is a convenient method of disposing them therein. The mean diameter of the plurality of round particles may be no more than ¼ of the 2 mm thick cavity (That is, the distance between the opposing inside surfaces between which the plurality of particles is disposed is 2 mm). This generally allows the plurality of round particles to form a close packed arrangement within the mold The mold 16 may be relatively simple (straight, thin walled tubular or sleeve geometry) and contributes to the economical manufacture (in this example, a single lathe operation to fabricate a thin walled sleeve shape) of a bearing component for a down-hole tool, for example a down hole bearing assembly.

Figure 3:
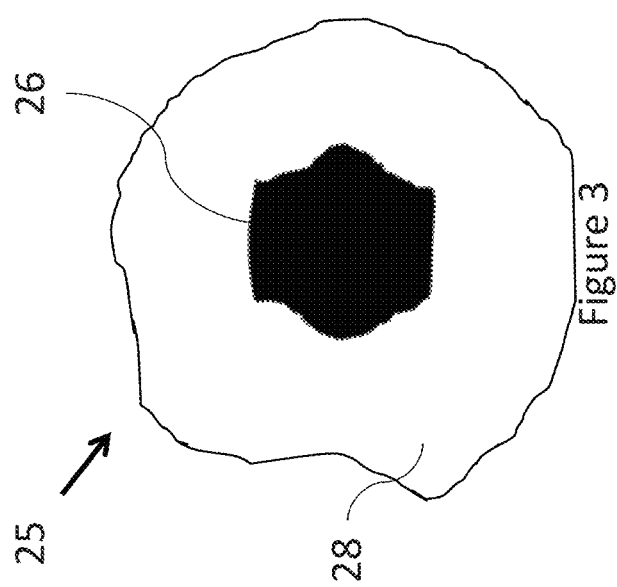
FIG. 3 shows a cross section of a representative particle of a plurality of round particles used in the method of FIG. 1.

FIG. 3 shows a cross section of a representative particle 25 of the plurality of round particles 24, the wear resistant element being indicated by the numeral 26 and the encapsulant being indicated by the numeral 28. The wear resistant element 26 is in this embodiment a super hard material, which is conventionally understood to be a material having a Vickers hardness of greater than 40 GPa. Examples of super hard materials that may be used include but are not limited to synthetic diamond, natural diamond and cubic born nitride. However, alternative embodiments do not have wear resistant elements comprising super hard material. The wear resistant element in this embodiment has an indentation resistance of greater than 20 GPa and an elastic modulus of greater than 200 GPa. The wear resistant element may be crystalline or polycrystalline. Other examples of suitable wear resistant element materials include silicon reacted polycrystalline diamond, catalyst-free polycrystalline diamond, alumina, partially stabilized zirconia, silicon carbide and silicon nitride. Generally, but not necessarily, wear resistant elements with a Vickers hardness exceeding 20 GPa may be used. The wear resistant element 26, in this but not in all embodiments, is synthetic diamond. The wear resistant element typically has a relatively low density of less than 6 Mg m$^{-3}$.

Surrounding the wear resistant element 26 is the round outer layer 28 ("encapsulant") that in this but not necessarily in all embodiments comprises a polycrystalline cermet in the form of tungsten carbide particles sintered with cobalt particles. A cermet is generally a composite material composed of ceramic particles (for example an oxide, boride or carbide) bound together with a metallic material (for example nickel, molybdenum, tungsten and cobalt and alloys thereof). The encapsulant differs from the wear resistant element in that it is of a lower hardness. The encapsulant is in this but not necessarily in all embodiment polycrystalline and prior to its fabrication into the bearing component may be present in different forms such as having unreacted and un-bonded adjacent grains through to fully sintered with low-to-no measurable porosity.

Figure 4:
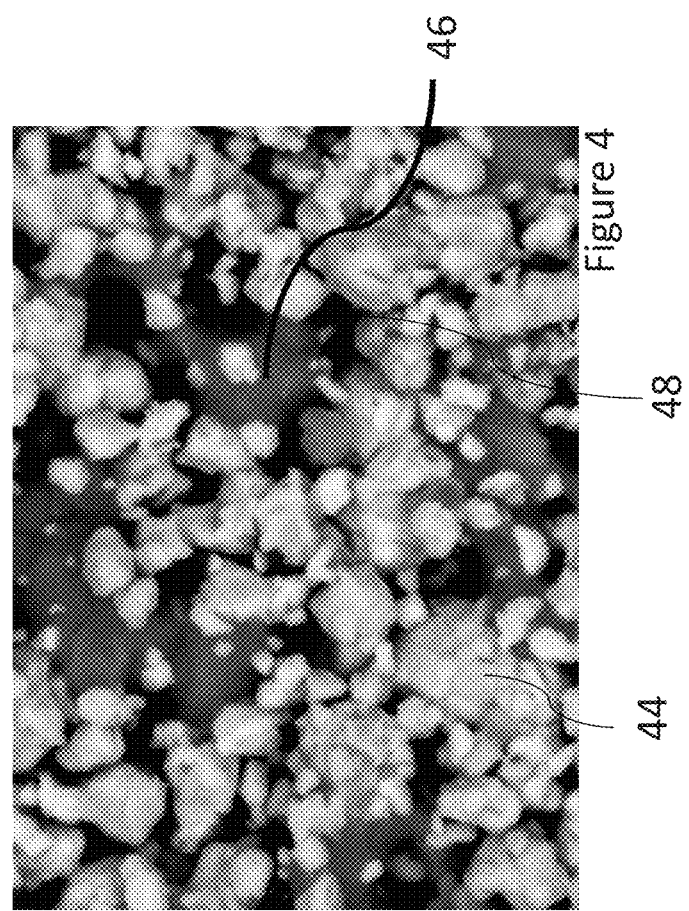
FIG. 4 is a Back Scattered Scanning Electron Micrograph of an encapsulant used in the plurality of round particles of FIG. 3.

FIG. 4 is a Back Scattered Scanning Electron Micrograph of the encapsulant 28. In this micrograph the polycrystalline material, in this case tungsten carbide 44 has sintered and bonded neighboring grains. A sintering aid material, in this case cobalt 46 has partly softened during the process of heating to form the encapsulant or pellet and in so doing has 'bridged' and joined to itself and the polycrystalline material 44. In this particular example the structure is not fully densified and voids or holes 48 are present within the structure. A semi-porous structure, with small pores and high-capillary forces is advantageous in terms of metallurgical bonding during the production of the bearing component. Density levels of the material used to form the grains within the encapsulant are higher than the wear resistant element (>6 Mg m$^{-3}$). The overall density and hardness of the encapsulant is dependent on the material used and the degree of sintering. Independent of the degree of sintering, and unlike the inclusion of a metallurgically reacted coating to the wear resistant element, the encapsulant will significantly increase the combined density of the wear resistant element. In the case where sintering is required, metals may be used in powder form as an aid to sintering. Examples of the materials used within the polycrystalline material include but are not limited to tungsten and tungsten carbide. Examples of the sintering aids used include but are not limited to cobalt, nickel and iron. Methods used to encapsulate the wear resistant elements within the encapsulant generally but not necessarily promote high degrees of sphericity, even when the wear resistant elements are not round or not spherical in nature, for example cuboid, acicular or elliptical. The majority of pellets used (>50%) contain one wear resistant element. The majority (>50%) of the wear resistant elements will be encapsulated within the encapsulant, so there will be a minority of examples (<50%) where the wear resistant element is not encapsulated by the encapsulant at all.

In the examples of FIGS. 1, 2 and 3 but not necessarily in all examples, the wear resistant element 26 is metallurgically bonded to a coating intermediate of the wear resistant element 26 and the encapsulating material 28. The coating may be deposited using different techniques, including but not limited to; chemical vapor deposition, physical vapor deposition and metallization. Such techniques provide a coating that is generally the order of a one to a few microns thick; e.g. 1-2 microns. The coating may be a metallic coating. Examples of coating materials include but are not limited to titanium and silicon where the wear resistant element 26 is a diamond.

Figure 5:
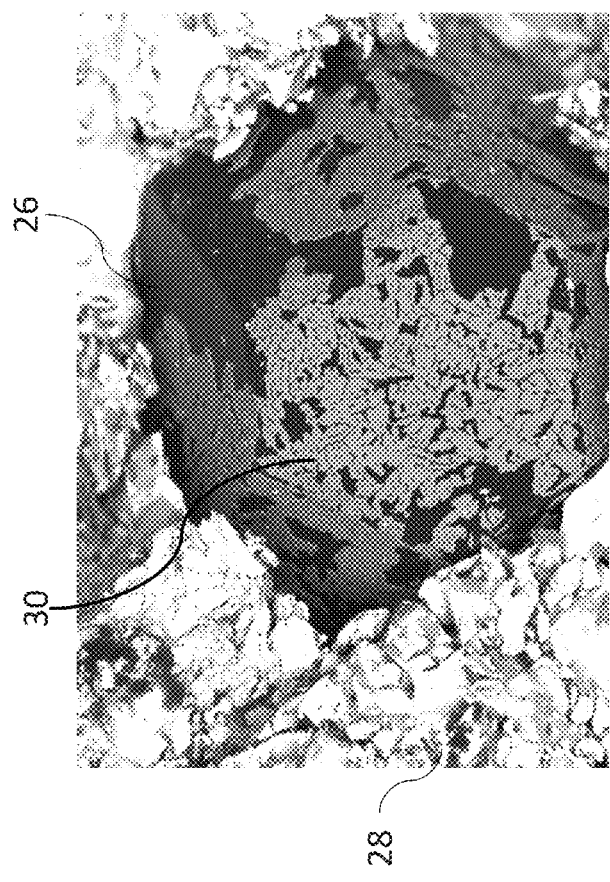
FIG. 5 is a Back Scattered Scanning Electron Micrograph of a fracture through one of the plurality of round particles of FIG. 3.

FIG. 5 is a Back Scattered Scanning Electron Micrograph of a fracture through the particle 25. The revealed coating 30 intermediate of the elements 26 and the encapsulating material is titanium. In the micrograph of FIG. 5, the titanium 30 that was originally completely surrounding and bonded to the wear resistant element 26 has been partly removed on fracture. The opposing fracture surface or pocket (not shown) contains remnants of the titanium, indicating equivalent metallurgical bonding between the titanium and the wear resistant element, and the titanium and the encapsulant. The volume of the coating is much less (generally but not necessarily less than 1/100) of that of the wear resistant element 26. The effect of the coating 30 will not significantly contribute to the overall density of the wear resistant element 26. The coating 30 may in some circumstances provide for a stronger bond between the wear resistant element 26 and the encapsulating material 28, together with thermal and chemical protection of the wear resistant element 26 during the manufacture of the bearing.

Figure 6:
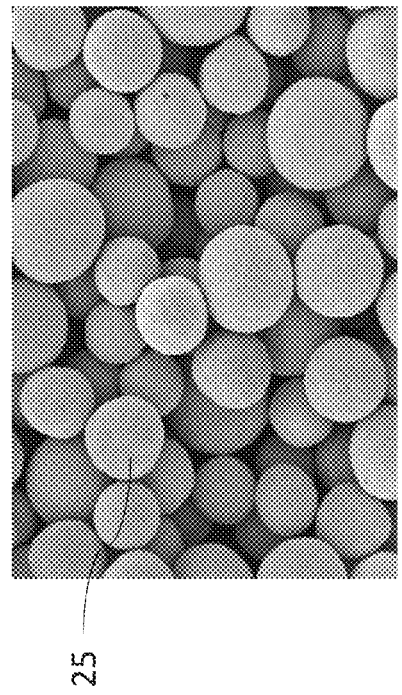
FIG. 6 shows a plurality of round particles.

FIG. 6 shows a plurality of round particles. A majority of the plurality of round particles 24 in this but not necessarily in all embodiments each have a diameter of between 70% and 130% of a mean diameter of the plurality of round particles. In other embodiments, the majority of the plurality of round particles may each have a diameter of between 80% and 120% of a mean diameter of the plurality of round particles. In yet other embodiments, the majority of the plurality of round particles may each have a diameter of between 90% and 110% of a mean diameter of the plurality of round particles. In still yet other embodiments, the majority of the plurality of round particles may each have a diameter of between 95% and 105% of a mean diameter of the plurality of round particles. The applicants are of the opinion that the narrower the distribution of diameters the less defects a close packed structure of the plurality of round particles will have and the better the performance of the bearing component. A bulk material or powder (hereafter referred to as "powder") comprising a plurality of round particles having a narrow distribution of diameters may, however, be relatively more expensive to produce.

The steps of the method of FIG. 1 will now be further described. The plurality of particles are initially in the form of a powder that is poured into the cavity 23 of the mold 16. After pouring, without further disturbance, the bulk material or powder in the mold 16 has a poured density. Another plurality of particles 32 is disposed in the mold. The other plurality of particles are initially in the form of another powder. The other powder 32 is poured onto the plurality of particles 24 disposed in the mold to form a layer of the other powder 32 over the layer of powder 24. The other plurality of particles 32 are sized to occupy a plurality of interstices between the plurality of round particles when in the close packed arrangement. The other plurality of particles are moved into the plurality of interstices between the plurality of round particles by agitating the mold. Agitating the mold also settles the plurality of particles into the close packed arrangement. The other plurality of particles are round, which was found by the applicant to improve their movement into the interstices between the plurality of round particles. In other embodiments, however, the particles may be cubes, octahedrons, icosahedrons, dodecahedrons, random shapes, or generally any suitable shape.

The other plurality of particles each have a diameter that is less than 14% of a mean diameter of the plurality of round particles. More of the plurality of interstices are occupied by the another plurality of particles when they each have a diameter less than 14%. The other plurality of particles, in some other embodiments, each has a diameter that is less than 29%. Laboratory trials were made of the settling of the plurality of round particles and the filling of the interstices there-between. The plurality of round particles were added to a glass cylinder. The glass cylinder was vibrated to settle the plurality of round particles into a close packed arrangement. The other plurality of particles were then poured onto the settle plurality of particles. Further vibration of the cylinder resulted in partial and incomplete filing of the interstices between the plurality of particles. In another trial, however, the other plurality of particles were poured over the plurality of particles in their freely settled state before vibration (the powder of the plurality of particles having a poured density), and the glass cylinder then vibrated. This approach resulted in the plurality of interstices being substantially filed with the other plurality of particles. In another laboratory trial, it was found that over vibration caused the other plurality of particles to accumulate at the bottom of the glass cylinder resulting is segregation of the plurality of particles from the other plurality of particles.

FIG. 7 shows a schematic diagram where the interstices of a plurality of particles, such as 25, are occupied with the other plurality of particles, such as 32. Each of the other plurality of particles has an wear resistant element 34 of super hard material encapsulated by an encapsulant 36, as described herein in respect to the plurality of particles.

FIG. 8 shows a schematic diagram where the interstices of a plurality of particles, such as 25, are occupied by the other plurality of particles, such as 38, which do not have an encapsulant. In this case but not necessarily in all cases, the other plurality of particles are harder than the encapsulant.

FIG. 9 shows a schematic diagram where the interstices of a plurality of particles, such as 25, are occupied by the other plurality of particles which comprise a first plurality of particles, such as particle 40, having a first mean diameter and a second plurality of particles, such as particle 42, having a second mean diameter that is less than the first mean diameter. The second mean diameter may be less than 10% of the first mean diameter. The inclusion of the second plurality of particles may result in better closure of the interstices. In one example, the plurality of round particles have a mean diameter of 0.333 mm, the first plurality of particles (primary interstitial particles) have a mean diameter of 0.098 mm and the second plurality of particles (secondary interstitial particles) have a mean diameter of 0.008 mm. The other plurality of particles may comprise a third plurality of particles (tertiary interstitial particles) that may have a mean diameter that is less than the second mean diameter, say 0.001 mm.

The other plurality of particles may be constructed from different materials such as diamond, tungsten carbide, tungsten, alumina, silicon carbide and silicon nitride. Their size and distribution may be selected to maximize the packing density and wear behavior when deposited within the hard facing consumable. In this embodiment, they are tungsten carbide.

Figure 23:
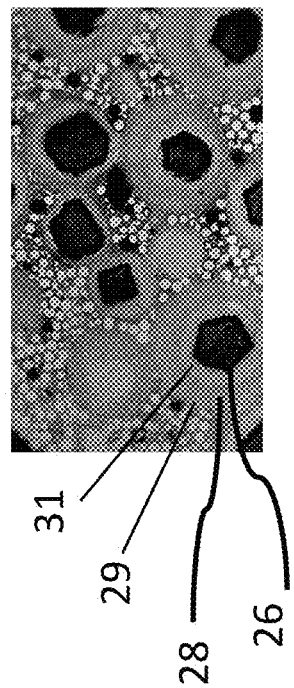
FIG. 23 shows a micrograph of an example of the composite material.

Nuggets, wires, rods, or grains of a brazing material 50 are placed above or in the cavity 23. Generally any suitable brazing material may be used. Examples of suitable brazing material include but are not limited to; copper, nickel, manganese, silver, tin, cobalt, cadmium, manganese, zinc, cobalt or an alloy of these. The braze material may also contain silicon and/or boron powder to aid in fluxing and deposition characteristics. In an embodiment, the braze material may comprise nickel, chromium, boron and silicon, wherein nickel may constitute 88%-95% by weight, chromium may constitute 0%-12%, boron may constitute 0%-1% and silicon may constitute 0%-1%. The mold is placed in a furnace and heat is applied to the mold 16 and brazing material 50 so that the brazing material melts and the molten brazing material infiltrates the interstices between the plurality of round particles. The heating time and the temperature of the furnace are selected for the braze material. For example, for the present embodiment in which a nickel alloy braze material is used, the molds may be kept in a furnace having an internal temperature of between 900-1200 degrees centigrade for five to 60 minutes, for example. The furnace may be an electrical, gaseous, microwave or induction furnace, or generally any suitable furnace. Furnace atmospheres may include at least one of air, nitrogen or hydrogen. On cooling, the brazing material forms a matrix in the form of a monolithic matrix that binds the plurality of round particles to form a body of composite material. The braze material may also, as in this embodiment, form a metallurgical bond with any interstitial particles that may be included. The round outer layer of each of the plurality of round particles generally may comprise a porous or skeletal structure, in which internal surfaces define internal voids and/or passageways. The braze material penetrates the porous or skeletal structure, and may fill the internal voids and/or passageways, to form a web within the round outer layer of at least a majority of the plurality of round particles. This results in a strong mechanical attachment to the plurality of round particles. FIG. 23 shows a micrograph of an example of the composite material. The round outer layer 28 comprises an outer shell 29 penetrated by the braze material and an inner shell 31 that is not penetrated by the binding material.

In the present embodiment, however, the braze material penetrates the round outer layer 28 to the coating 30 intermediate of the elements 26 and the round outer layer 28. The braze material is metallurgically bonded with the coating 30 intermediate of the element 26 and encapsulating material 28. Consequently, the wear resistant elements, in this embodiment diamonds, are metallurgically bonded to the braze material by way of the intermediate coating 30. This may generally improve the attachment of the wear resistant elements, especially when they are exposed by wear and mere mechanical attachment may be insufficient for their retention in the coating. This may improve the wear resistant coating's performance and life.

The solidified braze material is, in this but not necessarily in all embodiments, also metallurgically bonded to the plurality of round particles (which may comprise metal), at the outer surfaces of the plurality of round particles, and at internal surfaces of the plurality of round particles. This may further increase the strength of the bearing component.

The metallurgical bonds disclosed herein may comprise diffused atoms and/or atomic interactions. Under such conditions, the component parts may be "wetted" to and by the braze material.

During cooling and solidification the super hard wear resistant elements may be put into a compressive state by the braze material and also the surrounding encapsulant as the encapsulant sinters and reduces in volume. During the heating process, sintering of the grains within the encapsulant may occur. In some cases where the encapsulant is in contact with a neighboring encapsulant, neighboring round particles are bonded, further strengthening the composite material. If physical separation of the plurality of round particles were evident, such as in a sub-optimal packing arrangement then joining and bonding of the neighboring encapsulants would not occur.

The presence of the other plurality of particles in the interstices of the plurality of round particles may reduce defect levels within the finished bearing component. As an example, were mono-sized particles to be selected and the spacing between the particles was great, then shrinkage defects and voids may occur in a similar fashion to overly large joint gaps within a brazed part.

A substrate to the body of composite material may be integral to either one of the inner mold sleeve 18 and the outer mold sleeve 20. The substrate has a circular band configuration. The braze material also metallurgically bonds the body of composite material to the inner and outer mold sleeves and consequently the substrate. The material selected for the one of the inner mold sleeve 18 and the outer mold sleeve 20 generally has thermal and chemical compatibility with the body of composite material. Examples of suitable materials include, but are not limited to: plain carbon steel, alloyed steel, nickel based alloys, cemented carbides and aluminum-based materials.

The substrate may be separated from the mold with the body of composite material metallurgically attached to the substrate. If an outer bearing part or sleeve is required then the inner mold sleeve 18 is removed to expose the bearing surface, and if an inner bearing part or sleeve is required then the outer mold sleeve 20 is removed. The substrate is separated using a metal lathe, but may be separated using any suitable technique or machine, examples of which include but are not limited to a lathe, mill, grinder, electron beam machine, saw, water jet apparatus, and abrasive flow machine. Final grinding with a grinding machine may provide concentricity and dimensional requirements of the bearing surface. In another embodiment, grinding is not necessary to provide the concentricity and dimensional requirements of the bearing surface.

In this but not necessarily in all embodiments, the bearing surface is polished with another body of composite material. Polishing may be performed before use and/or during use of the bearing component. Complementary bearing components, for example 66 and 74 of FIG. 17, may be engaged. The bearing surface of one of the complementary bearing components may then slide over the other. This may be performed, for example, in the factory. Alternatively, this step may be performed during use down a hole, as break-in or run-in. The super hard material within the encapsulant when rubbing against another super hard material such as diamond will act to polish or wear-flat. This forms, in this embodiment, a facet (a flat surface) into the wear resistant elements of those of the plurality of round particles adjacent the bearing surfaces. The facets formed into the wear resistant elements of those of the plurality of round particles adjacent the bearing surface are flush with the surrounds thereof. This provides a generally superior bearing surface.

Figure 20:
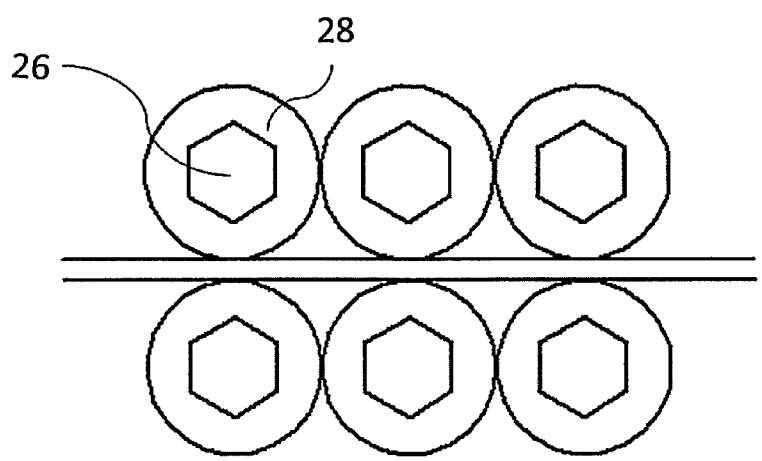
FIGS. 20 to 22 show the progression and increase in the area of a super hard material with increasing sliding against an opposing bearing surface.
Figure 21:
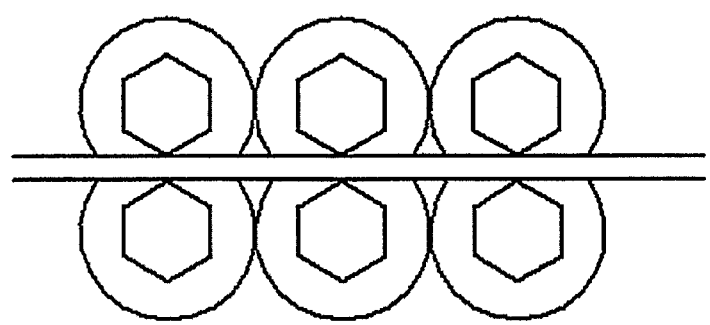
Figure 22:
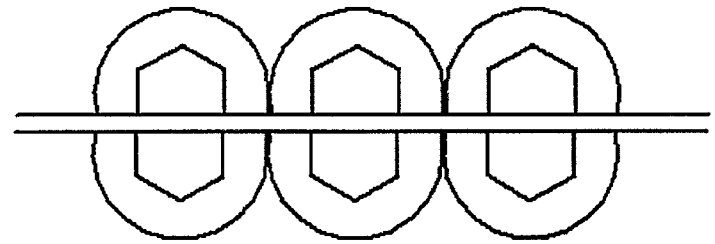

FIGS. 20 to 22 show the progression and increase in the area of the super hard material with increasing sliding against an opposing bearing surface. Initially (a) little-or-no super hard material is in contact with the opposing surface, with increased sliding and wear the super hard material makes initial contact but the contact area is low (b). With further and increased sliding the contact area increases as the super hard material increases in area (c). With the polishing effect the wear area is increased, and load carrying capacity and wear properties are improved. The number of wear resistant elements at the bearing surface is generally, but not necessarily, greater than 100 per cm$^2$. In the embodiments of FIGS. 15 and 16, the number of wear resistant elements may by greater than at least one of 500 and 1000 per cm$^2$. Because of the relatively high number of super hard particles per unit area, polishing or wear flatting is achieved preferentially to fracture, cleavage and loss of the super hard particles. In comparison, in diamond impregnated tools containing diamonds, for example, high wear flatting behavior would be undesirable as the tool would polish and cease cutting. Diamond impregnated drill bits, for example, may generally have less than 100 diamonds per cm$^2$.

The wear resistant elements of the embodiments of FIGS. 15 and 16 have an ISO 6106 mesh size of 30-120, for example 60-80. In comparison, the diamonds of a typical diamond impregnated bit may have a ISO 6106 mesh size in the range of 20 to 25.

Figure 10:
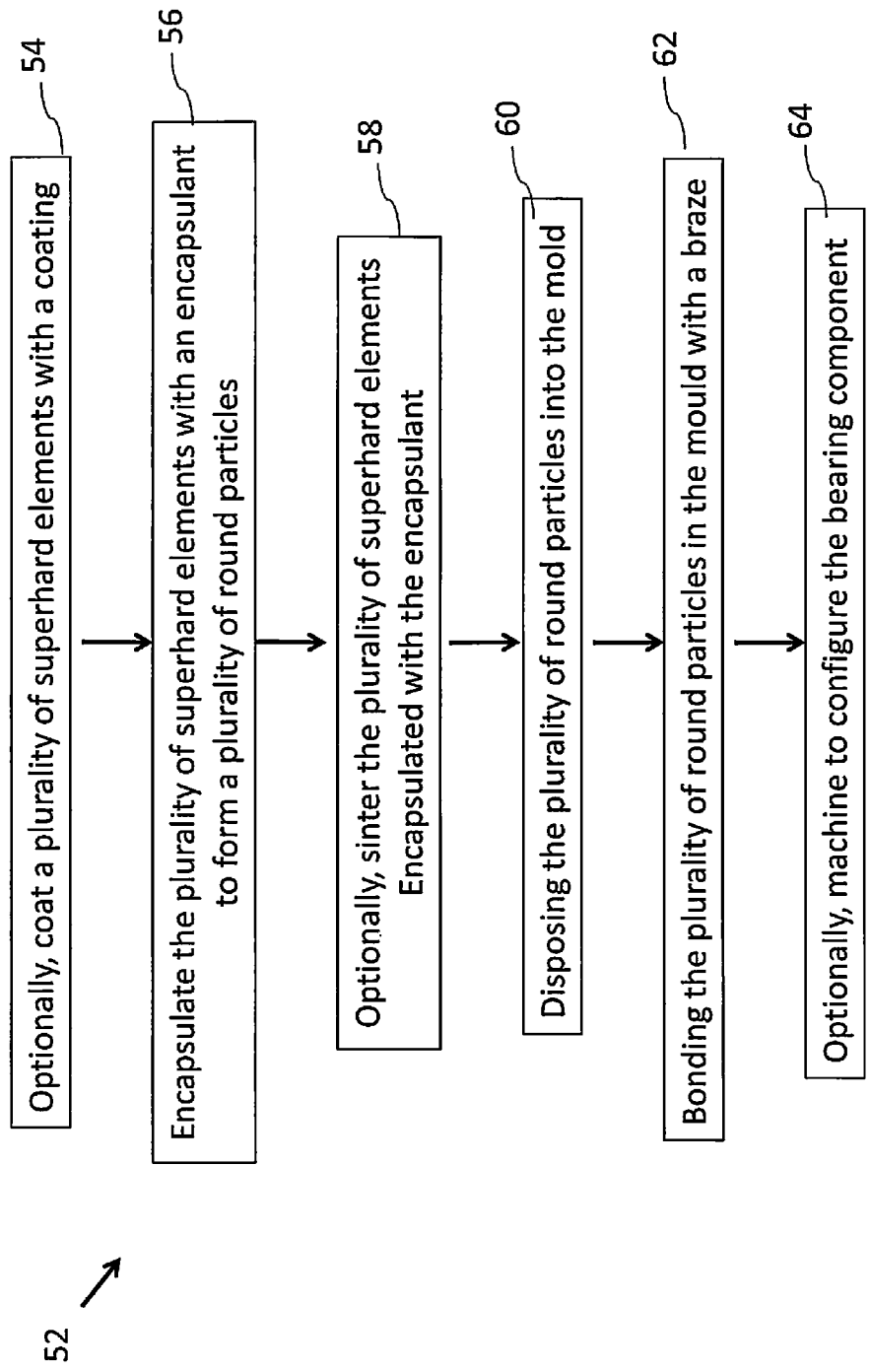
FIG. 10 shows a flow diagram of another embodiment of a method for making a bearing component.

FIG. 10 shows a flow diagram 52 of another embodiment of a method for making a bearing component. The steps 54, 58 and 64 are optional. The encapsulant need not be fully sintered before the plurality of round particles are put in the mold. The plurality of round particles may be not sintered ("green") of partially sintered ("partially green"). The plurality of superhard elements are encapsulated with an encapsulant to form the plurality of round particles (Step 56). Having a partially porous encapsulant by no or partial sintering (step 58) provides an opportunity for improved bonding of the plurality of round particles 24 to the surrounding braze material. The plurality of round particles may be purchased instead of made. The plurality of round particles are disposed in the mold (Step 60). At least one of primary, secondary and tertiary interstitial particles may be added as a multi-modal distribution to increase the packing density as described above. Additionally, fluxing agents in the form of chemical fluxing agents may be added prior to infiltration. Chemical fluxing agents may comprise borates and be selected for the chosen working times and temperatures. The other plurality of particles may be self-fluxing, examples of which include but are not limited to silicon and boron. The plurality of round particles may be bonded with a braze (step 62).

Figure 11:
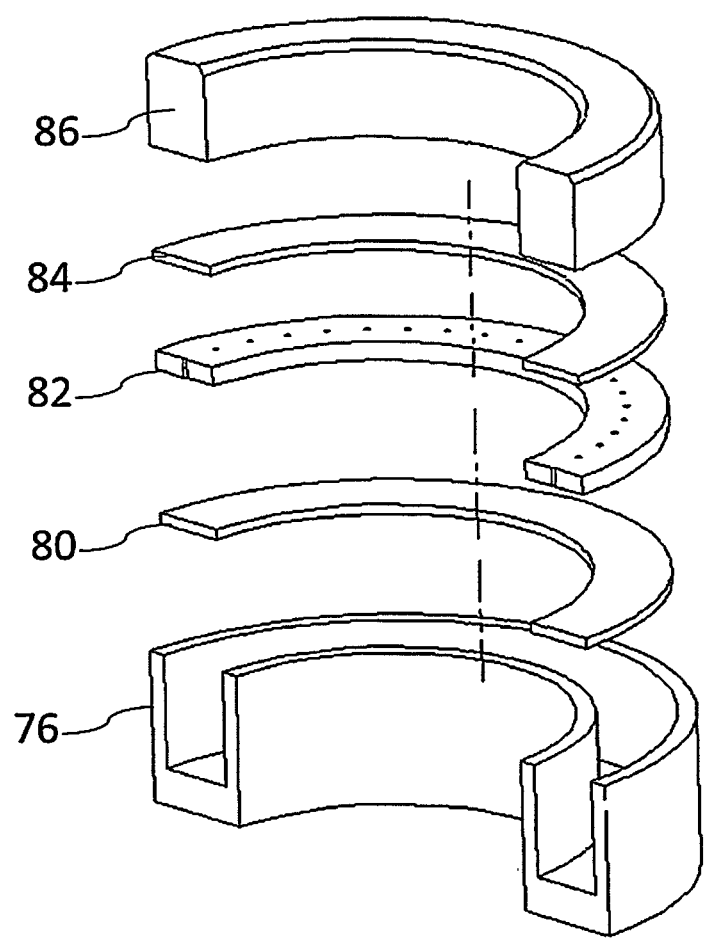
FIG. 11 shows an exploded view of another example of a mold in the form of a base mold for making a bearing component with materials disposed therein.

FIG. 11 shows an exploded view of another example of a mold in the form of a base mold 76 for making a bearing component with materials 80, 84, 86 disposed therein for making the bearing component. The mold is, in fact, circular, however a portion has been cut away for illustrative purposes. The mold of FIG. 11 is for making s bearing component in the form of part of a thrust bearing. In a first step, a binder material in the form of a material 80 is disposed in the mold 76. A capillary braze transfer plate 82 is then disposed in the mold 76. The capillary braze transfer braze plate 82 comprises a graphite annulus with a plurality of small holes that moves the braze when in liquid form from one side of the capillary transfer braze plate to the other by capillary action. A plurality of round particles 84 is then disposed in the mold on the capillary transfer braze plate. Optionally, another plurality of particles for filing the interstices between the plurality of round particles is placed in the mold 76 on the powder layer of the plurality of round particles. A substrate in the form of a metal annulus 86 is then received by the mold 76. The mold 76 is then heated in a furnace to melt the braze and the molten braze material moves up through the capillary transfer braze plate 82 to infiltrate the interstices between the plurality of round particles 84 and come into contact with the substrate 86. The substrate 86 caps or closes the mold 76 which may minimise the induction of air into the plurality of round particles 84 during heating and infiltration, which may improve the quality of the bearing component. On cooling, the braze material binds the plurality of round particles 84, optional other plurality of particles, and the substrate 86 to form the bearing component. The mold 76 and capillary transfer braze plate 82 may be separated from the bearing component by a mechanical or other cutting method, for example grinding, milling, using a lathe, sawing, chiseling, etc. The substrate and/or the bearing surface may have grooves arranged for the passage therethrough of a liquid, for example drilling mud, that may cool the bearing.

Figure 12:
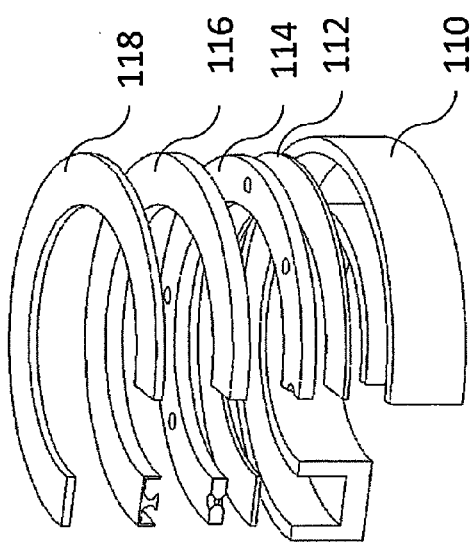
FIG. 12 shows another exploded view of another example of a mold in the form of a base mold for making a bearing component with materials disposed therein.

FIG. 12 shows an exploded view of yet another example of a mold in the form of a base mold 110 for making a bearing component with materials 112, 114, 116, 118 disposed therein for making the bearing component. Material 112 is a plurality of round particles. Material 114 is a steel substrate that may be pressed into the material 112. The steel substrate 114 has apertures formed therethrough. The outer diameter of the steel substrate is slightly smaller than the outer diameter of the plurality of round particles, which are encapsulated diamonds. Material 116 is tungsten metal powder. Material 118 is a binder. The mold may be heated and further processing as described above performed.

Figure 13:
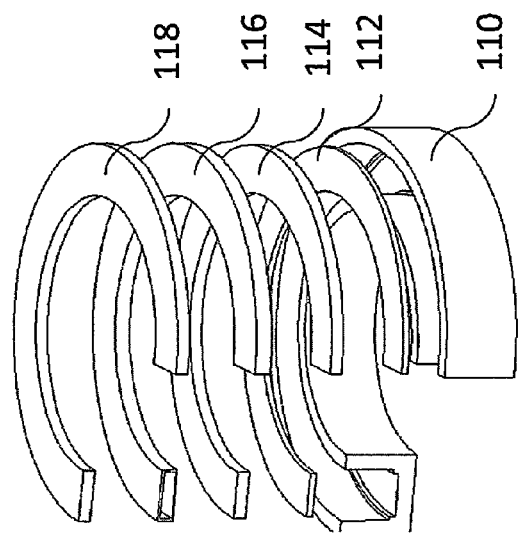
FIG. 13 shows still another exploded view of another example of a mold in the form of a base mold for making a bearing component with materials disposed therein.

FIG. 13 shows an exploded view of still another example of a mold in the form of a base mold 110 for making a bearing component with materials 112, 114, 116, 118 disposed therein for making the bearing component. Parts similar in form or function to those of FIG. 12 are similarly numbered. Material 112 is a plurality of round particles chamfered at the top and bottom. Material 114 is a steel substrate that may be pressed into the material 112. Material 116 is tungsten metal powder. Material 118 is a binder. The mold may be heated and further processing as described above.

Figure 14:
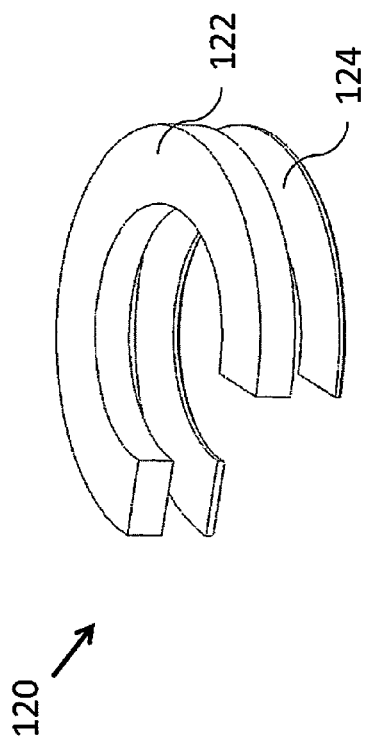
FIG. 14 shows in exploded view of an embodiment of a bearing component.

FIG. 14 shows in exploded view of an embodiment of a bearing component 120. The bearing component 120 is a single ring of round particles 124 of encapsulated diamond bound by a braze metal that infiltrated the round particles while in a liquid state. Alternatively, the bearing component may be hot pressed. The single ring of round particles is joined to a steel substrate 122 by, for example, brazing or laser welding.

Embodiments of bearing components made using the methods described above will now be described. FIG. 15 shows an embodiment of a bearing component in the form of a bearing inner sleeve 66 for a radial bearing made using the method described above. The bearing inner sleeve 66 comprises a body of composite material 68. The body of composite material 68 has an outward facing surface configured as an outward facing cylindrical bearing surface 70. The composite material 68 comprises a plurality of round particles as described above in a close packed arrangement bonded by a braze material. Each of the plurality of round particles comprises an encapsulant encapsulating a wear resistant element that is harder than the encapsulant, as described above.

The body of composite material 68 has a circular band configuration, and is metallurgically attached to a substrate 72. The mold outer sleeve 20 has been removed by the lathe to reveal the bearing surface 70. In an alternative embodiment, the mold inner sleeve 18 is the substrate 72 so that no separation of the substrate from the mold inner sleeve 18 or machining of the inner mold sleeve is required.

FIG. 16 shows an embodiment of a bearing component in the form of a bearing outer sleeve 74 for a radial bearing made using the method described above, were parts similar in form and/or function to those of FIG. 12 are similarly numbered. The bearing outer sleeve 74 comprises a body of composite material 68. The body of composite material 68 has an inward facing surface configured as an inward facing bearing surface 71.

The body of composite material 68 of the bearing outer sleeve 74 has a circular band configuration, and is metallurgically attached to an annular substrate 72. The mold inner sleeve 20 is removed by the lathe to reveal the bearing surface. In an alternative embodiment, the mold outer sleeve 20 is the substrate so that no separation of the substrate from the mold outer sleeve 20 or machining of the mold outer sleeve 20 is required.

In the embodiments of FIGS. 1 and 2, the composite material 68 comprises a plurality of round particles as described above in a close packed arrangement bound by a braze material. Each of the plurality of round particles comprises an encapsulant encapsulating a wear resistant element that is harder than the encapsulant, as described above. The wear resistant elements have a hardness exceeding 40 GPa, and an elastic modulus of greater than 200 GPa. In some alternative embodiments, the wear resistant elements have a hardness exceeding 20 GPa. One embodiment is identical to that of FIGS. 1 and 2 except the wear resistant elements have a hardness exceeding 20 GPa.

In the embodiments of FIG. 15 and FIG. 16, the majority of the plurality of round particles each have a diameter of between 70% and 130% of a mean diameter of the plurality of round particles. A plurality of interstices between the plurality of round particles are occupied by another plurality of particles. The other plurality of particles are in this but not necessarily in all embodiments harder than the encapsulant. A majority of the other plurality of particles each have a diameter that is less than 14% of the size of a mean diameter of the plurality of round particles. The other plurality of particles comprises a first plurality of particles having a first mean diameter and a second plurality of particles having a second mean diameter that is less than 10% of the first mean diameter. A mean diameter of the plurality of round particles is no more than ¼ of the thickness of the body of composite material. The body of composite material has a thickness less than 2 mm and a height greater than 100 mm.

FIG. 17 is a perspective cut away view of an example of a radial bearing 76. The radial bearing 76 has the bearing inner sleeve component 66 of FIG. 12 disposed within the bearing outer sleeve component 74 of FIG. 13. The outward facing surface 70 of the bearing inner sleeve 66 and the inner facing surface 71 of the bearing inner sleeve 66 are free to slide over each other.

FIG. 18 shows an embodiment of a down hole device in the form of a down hole bearing assembly 88. The down hole bearing assembly comprises a bearing assembly casing 102 in which is housed a plurality of bearings each having a circular band configuration and each comprising a plurality of bearing components in accordance with the above disclosure. The down hole bearing assembly 88 has radial bearings 90, 92, an angular contact annular axial (thrust) bearing 94, and planar contact axial bearings 96, 98 and 100. The down hole bearing assembly comprises a mandrel 104 passing through each of the plurality of bearings 90, 92, 96, 98, 100. The mandrel is configured at an end thereof 106 for attachment of a drill bit. The configured end 106 in this embodiment has a drill bit connection box with internal threads for engagement with a drill bit. The down hole bearing assembly 88 has a flow diverter 108 which controls the flow of drilling fluid or mud amongst the bearing assembly (outside the mandrel) and openings through the drill bit (the drilling fluid flows through the inside of the mandrel shaft).

Figure 19:
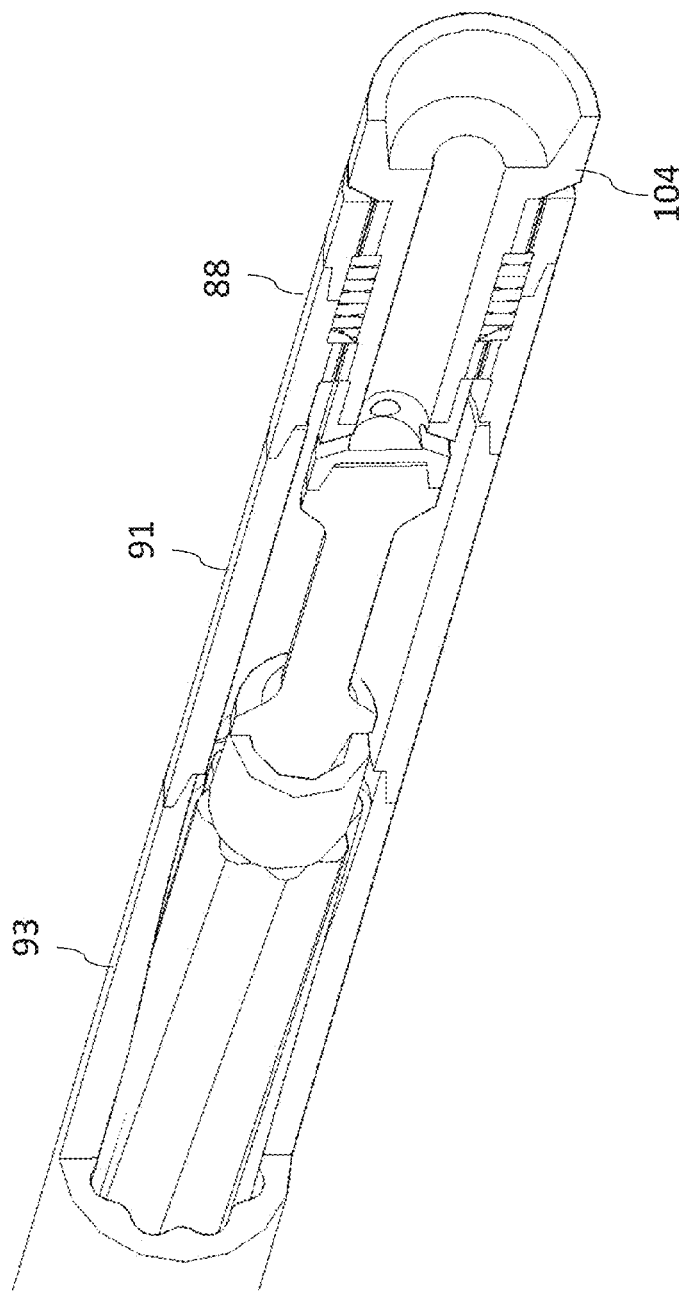
FIG. 19 shows a perspective view of a distal end of an example of a drill string having the assembly of FIG. 18.

The distal end of a drill string 89 including the down hole bearing assembly 88 (not including the drill bit) is shown in FIG. 19. The down hold bearing assembly 88 is coupled to a motor 93 via a transmission assembly 91 coupled to the mandrel 104 for the transmission of power from the motor to the mandrel. The motor in this embodiment is a positive displacement motor ("mud motor") that creates torque by way of the high pressure mud forcing a twisted tooth shape shaft (rotor) to rock its way around inside a similarly shaped housing. The shaft will normally have one less lobe (or tooth) than the female (stator) so that a gap is always created on one side. The high-pressure mud fills this gap and because of the twisted shape of the teeth it forces the rotor to rock into the next tooth. As the rotor rocks into each tooth it makes its way around the inside of the stator. The center of the rotor moves around a small circular path rather than spinning directly on it long axis. Because of this non-concentric rotation of the rotor, the transmission assembly 90 is used (which may comprise, for example, a ball link, flexible shaft, u-joints) to connect and transmit torque to the bearing assembly 88. In summary, in the example of FIG. 19 but not necessarily in all examples, the motor 93 contains a rotor and stator that create the "off-axis" rotation and torque, the transmission assembly 91 aligns the off-axis rotation, and the bearing section which includes the flow diverter contains all of the bearings and the mandrel that transfers rotation and torque to the drill bit while also providing thrust and axial support.

The high wear resistance of the composite material of the bearings components may result in down hole devices, particularly down hole bearing assemblies, that have smaller bearings. Consequently, the bit-to-bend distance may be relatively small improving the performance of directional drilling. Alternatively or additionally, the time between services, operating costs, load bearing capacity, wear resistance, and thrust load for a down hole bearing assembly with the bearing components described herein may be improved.

Fluid flow through the bearings and the drill bit when attached to the drill bit connection box 106 may cool the bearings and drill bit, and also function to transport cuttings generated by operation of the drill bit away from the site of ground engagement. The fluid carrying the cuttings is forced back to the surface through an annular space between the down hole assembly and drill pipe or wall of the drilled hole.

Fabrication of the Plurality of Round Particles

An example method for the fabrication of examples of the plurality of round particles will now be described. Generally, any suitable method for fabrication of round particles may be used. A mixture of tungsten carbide powder having a Fisher sub sieve size of one µm and cobalt powder having a Fisher sub sieve size of 1.2 µm were mixed 50/50 by weight.

Alternatively or additionally to cobalt, any suitable metal powder may be used, for example a powder comprising at least one of nickel, copper, and alloys thereof. MBS955 Si2 40/50 mesh diamonds are tumbled in the mixture of tungsten carbide powder and cobalt powder with a binding agent in the form of methyl cellulose while controlled amounts of water is simultaneously sprayed thereon. Each diamond is coated to form the plurality of round particles in a green state. The plurality of round particles in the green state may then be heated in a Borel furnace under a protective hydrogen atmosphere. The plurality of round particles in the green state may be heated around room temperature to 500° C. over an hour approximately. The plurality of round particles are maintained at 500° C. for around 30 min. The temperature is then elevated to 850° C. over around 180 min. The sintered plurality of round particles are allowed to cool.

Now that embodiments have been described, it will be appreciated that some embodiments may have some of the following advantages:

Encapsulated wear resistant elements may provide a relatively high packing density and even distribution of super hard wear resistant elements. This may provide relatively high levels of structural integrity within the resulting composite material and excellent bonding to a substrate. The bearing surface may have a high hardness, high wear resistance, high load capacity, excellent frictional behavior. These features may allow the bearing assembly to maintain peak performance for a significantly longer period of time in down-hole use.

Wear resistant elements are typically, but not necessarily, ceramic-based and are often at a much lower density than the materials used in the conventional construction of a bearing. Due to these density differences, these phases may be poorly distributed and may be in close proximity to one another, or even touching which may weaken the structure because braze infiltration may be reduced. Thin coatings onto a super hard material may not fully overcome these density differences or avoid part-to-part contact. Encapsulation of the super hard phases may ameliorate these problems.

The round nature of the encapsulant combined with careful selection of sizes and shapes of interstices occupying particles may promote high packing during vibration of the mold and further optimizes wear resistance.

The structure of the encapsulant may be either an open or closed structure. An open semi-porous topography may provide high surface area and strong capillary forces for reaction and infiltration with other hardfacing materials.

During cooling and solidification of the braze material, the encapsulated wear resistant elements may be placed under compression by the encapsulant, providing improved retention and better wear properties.

The bearing surfaces may need relatively little or no grinding prior to use, which is a problem of prior art bearings having super hard monoliths at the bearing surface.

The wear resistant element is surrounded by a round outer coating of a reduced hardness. When this encapsulant is in contact with the mold walls it provides a space between the super hard phase and the mold wall. This may result in reduced grinding costs as the super hard phase may not be, for the most part, significantly ground and removed to meet concentricity and dimensional specifications required of the bearing.

The wear resistant elements may have a diameter of less than 2 mm and may be surrounded by a round encapsulant. When compared to large polycrystalline diamond compacts and silicon bonded polycrystalline diamond monoliths, this may result in significantly reduced grinding and finishing costs.

The use of wear resistant elements encapsulated in a round outer coating enables a mold of complex and changing geometry to be filled completely and faithfully to the external profile; including Planar and Non-Planar geometries. In contrast some prior art bearings use TSP, PDC and silicon-bonded polycrystalline diamond monoliths that may be too large and lack the ability to be strategically placed in small annular spacing.

A continuous surface may be made through the incorporation of round and closely packed encapsulated wear resistant elements that may produce a superior bearing surface. Prior art bearings with PDC and silicon-bonded polycrystalline diamond monoliths by their very nature form a discontinuous mating surface, as each monolith is placed adjacent to its neighboring part. Each wear resistant element is included within a pocket and can never directly contact one another.

The liquid metal infiltration of the encapsulant and subsequent solidification may provide a mechanically improved compressive stress that holds and bonds the wear resistant element. This advantage may not be enjoyed by non-encapsulated wear resistant elements. Were largely non-encapsulated wear resistant elements included, such as synthetic diamond grit or thermally stable polycrystalline diamond (TSP), in a surrounding matrix such as tungsten carbide powder, then suboptimal distributions may be encountered due to density and shape differences during manufacture of such a bearing. Such a structure may have poorly distributed particles that are poorly bonded in comparison to the round encapsulated super hard material described herein. In the case of an encapsulated super hard material applied in such a way these density differences are largely overcome.

The super hard materials used within this disclosure may have greater hardness and wear resistance compared to tungsten carbide based metal matrices formed by hard-facing and/or liquid metal infiltration. In direct comparison, in a diamond grinding test, the composite material described herein was found to be twenty times more wear resistant than a tungsten carbide based material system.

The approximately regular spacing of the round encapsulated wear resistant elements may allow for a large number of wear resistant elements to be exposed on slight wear of the bearing surface. The result of the high number of hard and high-modulus particles may create an exceptional bearing surface in terms of load capacity. In other tools such as Diamond Impregnated Mining, and Oil and Gas bits, the use of super hard particles provides a cutting structure where super hard particles crush, are lost and 'fresh' super hard particles are exposed when drilling through rock. Embodiments provide sliding between opposing bearing surfaces that each have closely spaced wear resistant elements, creating flattening and polishing behavior with little material removal and reduced wear rates.

Wear resistant elements may have very low coefficients of friction when compared to more conventional materials, thus reducing torque and specific energy requirements.

The composite material may exhibit higher thermal conductivities when compared with conventional materials, providing enhanced cooling of the rotating bearing surfaces.

The extreme hardness of the super hard materials described herein, combined with their improved thermal conductivity, may lower friction and torque when compared with cemented carbide monoliths and may postpone or eliminate thermally generated cracking and structural load cracking typical of cemented carbide monoliths used in down-hole bearings. These cracks develop over time due to the compressive and/or bending loads applied, and become more prevalent and destructive as each monolith gets thinner due to premature wear of the contact surface. Unlike the fracture/cracking failure of said monolith types, the composite material described herein can significantly reduce the wear rate due to the fine distribution of the individual, superior load carrying wear resistant elements located at the bearing surfaces.

The wear resistant elements may be metallurgically bonded to the braze material by way of the intermediate coating 30. This may improve the attachment of the wear resistant elements and the bearing component's performance and life.

Variations and/or modifications may be made to the embodiments described without departing from the spirit or ambit of the invention. For example, while the embodiments of bearing components described herein are configured for radial and thrust bearings, it will be appreciated that the bearing components may have any suitable configuration. The bearing components as described herein may be used in journal bearings, linear bearings, integral bearings, bushings, crankshaft bearings, ball bearings and roller bearings. While the illustrated down hole device is a down hole bearing assembly, the bearings may generally be used in any suitable type of down hole device, for example down hole rotary steerable systems, down hole mud lubricated and/or mud powered turbines, under-reaming or stabilizing devices with rotating or sliding bearing elements, geo-sample drilling or coring devices with rotating or sliding bearing elements that may be activated passively or on command remotely from the surface, and "Measurement While Drilling" (MWD) devices with rotating or sliding bearing elements. The other plurality of particles may be omitted. The present embodiments are, therefore, to be considered in all respects as illustrative and not restrictive.

Prior art, if any, described herein is not to be taken as an admission that the prior art forms part of the common general knowledge in any jurisdiction.

In the claims which follow and in the preceding description of the invention, except where the context requires otherwise due to express language or necessary implication, the word "comprise" or variations such as "comprises" or "comprising" is used in an inclusive sense, that is to specify the presence of the stated features but not to preclude the presence or addition of further features in various embodiments of the invention.

The invention claimed is:

1. A bearing component comprising:
a body of composite material having a surface configured as a bearing surface, the composite material comprising a plurality of round particles bound by a braze material, each of the plurality of round particles comprising a round outer layer encapsulating a wear resistant element wherein the surface comprises a plurality of partially encapsulated wear resistant elements each having a polished facet flush with the surrounds thereof.

2. A bearing component defined by claim 1, wherein the braze material comprises a monolithic matrix of braze material.

3. A bearing component defined by claim 1, wherein the braze material penetrates the round outer layer of each of the plurality of round particles.

4. A bearing component define by claim 1, wherein the wear resistant element of each of the plurality of round particles has a coating metallurgically bonded thereto, the coating being intermediate of the wear resistant element and the round outer layer encapsulating the wear resistant element, wherein the coating being metallurgically bonded to the braze material.

5. A bearing component defined by claim 1, wherein the braze material is metallurgically bonded to at least one of an inner surface and an outer surface of the round outer layer of each of the plurality of round particles.

6. A bearing component defined by claim 1, wherein the number per unit area of the plurality of round particles adjacent the bearing surface is greater than at least one of 100 per $cm^2$, 500 per $cm^2$, and 1000 per $cm^2$.

7. A bearing component defined by claim 1, wherein a plurality of interstices between the plurality of round particles are occupied by another plurality of particles.

8. A bearing component define by claim 7, wherein the other plurality of particles each have a diameter that is less than one of 29% and 14% of the size of a mean diameter of the plurality of round particles.

9. A down hole device comprising at least one bearing comprising a plurality of bearing components defined by claim 1.

10. A down hole bearing assembly comprising:
a bearing assembly casing in which is housed at least one bearing having a circular band configuration, the at least one bearing comprising a plurality of bearing components defined by claim 1; and
a mandrel passing through the at least one bearing, the mandrel being configured at an end thereof for attachment of a drill bit.

* * * * *